(12) United States Patent
Taxacher et al.

(10) Patent No.: US 11,767,570 B2
(45) Date of Patent: Sep. 26, 2023

(54) PROTECTIVE MASK BY TWO MATERIAL ADDITIVE MANUFACTURING, AND RELATED METHOD

(71) Applicant: General Electric Company, Schenectady, NY (US)

(72) Inventors: Glenn Curtis Taxacher, Simpsonville, SC (US); Claire Fridtjof Lang, Greenville, SC (US)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 16/837,084

(22) Filed: Apr. 1, 2020

(65) Prior Publication Data
US 2021/0310090 A1   Oct. 7, 2021

(51) Int. Cl.
| | | |
|---|---|---|
| *C21D 7/06* | (2006.01) | |
| *B33Y 10/00* | (2015.01) | |
| *B33Y 80/00* | (2015.01) | |
| *B29C 64/118* | (2017.01) | |
| *B05B 12/26* | (2018.01) | |
| *B05C 21/00* | (2006.01) | |
| *B22F 10/00* | (2021.01) | |

(52) U.S. Cl.
CPC ............... *C21D 7/06* (2013.01); *B05B 12/26* (2018.02); *B05C 21/005* (2013.01); *B29C 64/118* (2017.08); *B33Y 10/00* (2014.12); *B33Y 80/00* (2014.12); *B22F 10/00* (2021.01)

(58) Field of Classification Search
USPC ...................................................... 118/504
See application file for complete search history.

(56) References Cited

U.S. PATENT DOCUMENTS

| | | |
|---|---|---|
| 4,743,462 A | 5/1988 | Radzavich et al. |
| 5,985,122 A | 11/1999 | Conner |
| 8,661,826 B2 | 3/2014 | Garry et al. |

(Continued)

FOREIGN PATENT DOCUMENTS

| | | |
|---|---|---|
| EP | 3002345 A1 | 4/2016 |
| EP | 3156513 A1 | 4/2017 |

(Continued)

OTHER PUBLICATIONS

Extended European Search Report from corresponding EP patent application No. 21163010.8 dated Jul. 27, 2021, 9 pages.

*Primary Examiner* — Jethro M. Pence
(74) *Attorney, Agent, or Firm* — James Pemrick; Charlotte Wilson; Hoffman Warnick LLC

(57) ABSTRACT

A protective mask for a part, the part including a plurality of openings in a surface thereof, is provided. The protective mask includes a mounting member at least partially within each of at least two of the plurality of openings. Each mounting member includes a water soluble material. A masking member couples the at least two mounting members. The masking member includes a non-water soluble material. Each mounting member includes a first plurality of integral layers of the water soluble material, and the masking member includes a second plurality of integral layers of the non-water soluble material. The protective mask can be made by a two material additive manufacturing system. A related method is also provided.

20 Claims, 6 Drawing Sheets

(56) References Cited

U.S. PATENT DOCUMENTS

| | | | |
|---|---|---|---|
| 8,887,662 B2 * | 11/2014 | Bellino | B05D 3/042 |
| | | | 118/504 |
| 8,985,049 B2 * | 3/2015 | Bellino | C23C 4/01 |
| | | | 216/41 |
| 9,551,058 B2 | 1/2017 | Reid et al. | |
| 10,100,668 B2 | 10/2018 | Bromberg et al. | |
| 10,272,461 B2 * | 4/2019 | Coskun | B25J 19/023 |
| 2014/0141174 A1 | 5/2014 | Garry et al. | |
| 2015/0079288 A1 * | 3/2015 | Sordelet | B05B 12/26 |
| | | | 118/505 |
| 2017/0101539 A1 * | 4/2017 | Pan | C23C 4/134 |
| 2017/0129013 A1 | 5/2017 | Bunker | |
| 2019/0054568 A1 | 2/2019 | Eary et al. | |
| 2020/0061662 A1 | 2/2020 | Cui et al. | |

FOREIGN PATENT DOCUMENTS

| | | |
|---|---|---|
| EP | 2913420 B1 | 10/2017 |
| GB | 2461898 B | 9/2010 |

* cited by examiner

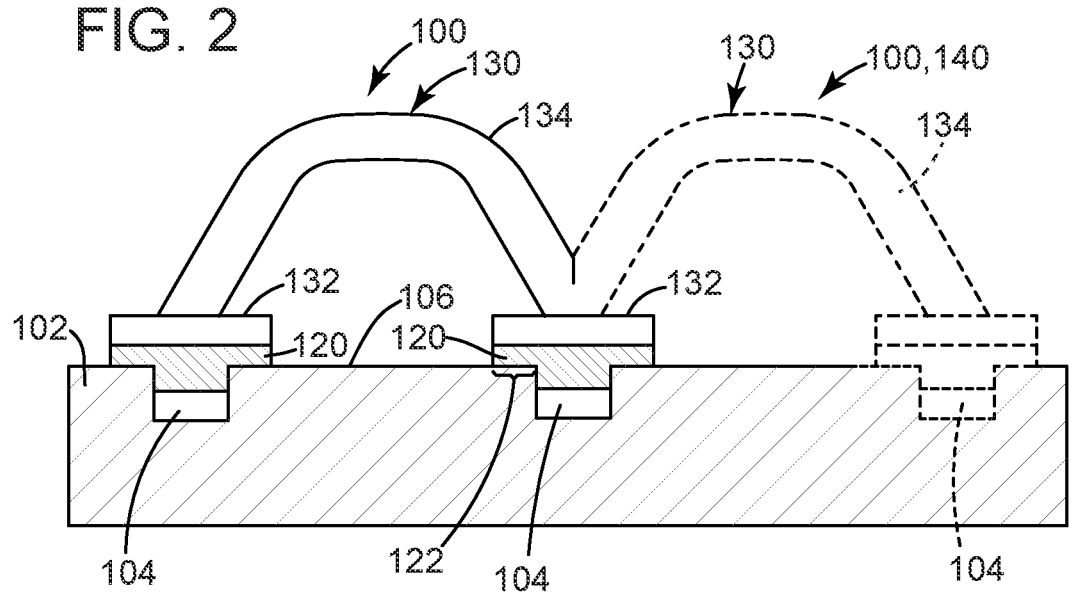
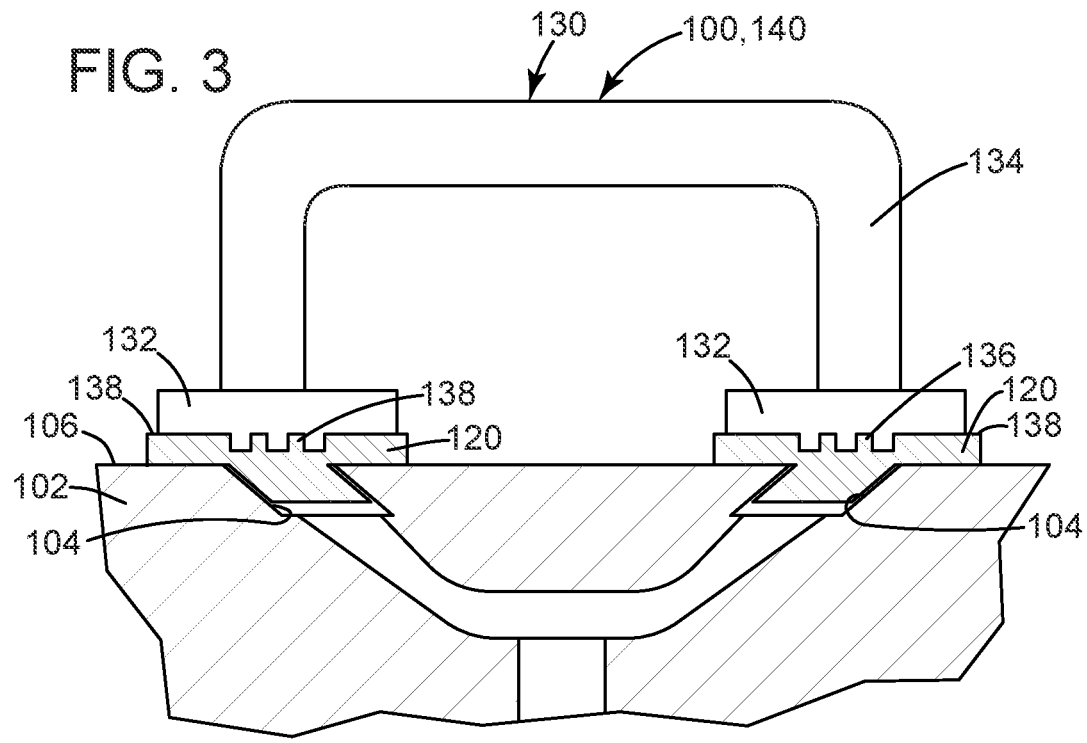

PROTECTIVE MASK BY TWO MATERIAL ADDITIVE MANUFACTURING, AND RELATED METHOD

BACKGROUND

The disclosure relates generally to part manufacturing, and more particularly, to a protective mask for covering openings in a surface of a part. The protective mask includes two members, one made of a water-soluble material. Both members are formed by additive manufacturing.

Industrial parts may be exposed to a variety of processes after manufacture to finish the part. In one example, a part may be exposed to a shot peening in which the surface of the part is bombarded with a peening material such as metal shot. In another example, the part may be coated with a protective layer to protect the underlying material thereof from the harsh environments in which the part is used. For example, a thermal barrier coating (TBC) may be applied to an outer surface of a turbine rotor blade to protect the blade from high temperatures during use.

Some parts may include openings in a surface thereof that need to be protected during the post-formation processing. For example, a turbine rotor blade may include a variety of internal cooling circuits that vent to an outer surface of the part through cooling passages, i.e., openings in the surface of the part. The cooling passages may be provided to cool the internal structure where they are present, and/or create a cooling film across the outer surface of the part.

A variety of mechanisms are employed to protect the openings. In some cases, removable material such as plugs may be provided in or over the openings to, for example, prevent them from being filled as a coating is applied thereover. The removable material blocks the coating from entering the openings but increases manufacturing time and complexity because the removable material and/or the coating thereover must ultimately be removed. For example, each opening must have the blocking material removed, which can be time consuming. Furthermore, the coating is typically applied over the blocking material, but needs to be removed from over the blocking material to expose the blocking material and/or the openings. Because the coating bridges over the blocking material, removal of the coating can cause extensive cracking in the rest of the coating, e.g., a TBC, that may render the part unusable or require extensive additional processing. Removal of blocking material after a peening process can be especially challenging where the blocking material is seized with the part's material by the process. Other approaches employ shielding features such as an overhang to protect the openings. In some cases, the overhangs are removed in which case they present similar challenges to removable blocking material. In other cases, the overhangs remain as an integral portion of the part. In this latter case, the complexity of the part is increased, and the performance of the part may be sacrificed to accommodate the overhang. Regardless of approach, current processes for protecting openings in a surface of a part can be challenging in that forming and/or removing the protective mask alone can be very complicated.

Additive manufacturing (AM) includes a wide variety of processes of producing a part through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Accordingly, many industrial parts such as turbine rotor blades are made by additive manufacturing. Additive manufacturing advances have resulted in systems that can print using two different materials.

BRIEF DESCRIPTION

A first aspect of the disclosure provides a protective mask for a part, the part including a plurality of openings in a surface thereof, the protective mask comprising: a mounting member at least partially within each of at least two of the plurality of openings, wherein each mounting member includes a water soluble material; and a masking member coupled to the mounting member, the masking member including a non-water soluble material, and wherein each mounting member includes a first plurality of integral layers of the water soluble material, and the masking member includes a second plurality of integral layers of the non-water soluble material.

A second aspect of the disclosure provides an additively manufactured (AM) structure, comprising: a part including a plurality of openings in a surface thereof; and a protective mask, including: a mounting member at least partially within each of at least two of the plurality of openings, wherein each mounting member includes a water soluble material, and a masking member coupling the, at least, two mounting members, the masking member including a non-water soluble material, wherein each mounting member includes a first plurality of integral layers of the water soluble material, and the masking member includes a second plurality of integral layers of the non-water soluble material, and wherein each mounting member and the masking member are formed using an at least two material additive manufacturing system.

A third aspect of the disclosure provides a method, comprising: first sequentially dispensing a fluid water soluble material in a pre-determined path layer-by-layer to selectively generate a mounting member at least partially within at least two of a plurality of openings in a surface of a part; and second sequentially dispensing a fluid non-water soluble material in a pre-determined path layer-by-layer to selectively generate a masking member coupling the at least two mounting members.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 2 shows an enlarged side view of the AM structure including a protective mask on a part, according to embodiments of the disclosure;

FIG. 3 shows an enlarged side view of an AM structure including a protective mask on a part, according to other embodiments of the disclosure;

Figure 1:
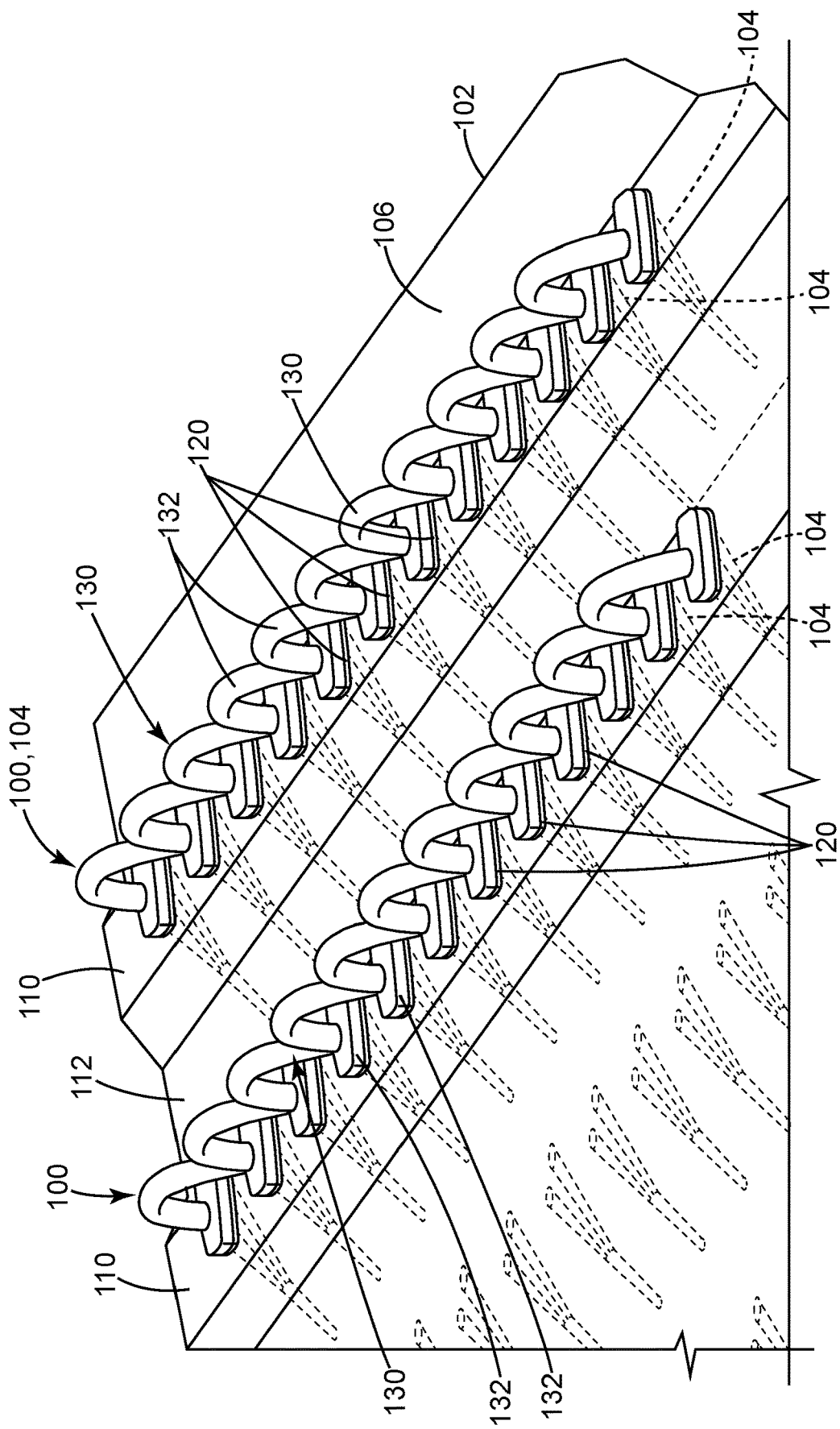
FIG. 1 shows a perspective view of an additive manufactured (AM) structure including a protective mask on a part, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant components. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part. Several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a protective mask for a part, the part including a plurality of openings in a surface thereof. The protective mask includes a mounting member at least partially within each of at least two of the plurality of openings. Each mounting member includes a water soluble material. A masking member couples the at least two mounting members. The masking member includes a non-water soluble material. Each mounting member includes a first plurality of integral layers of the water soluble material, and the masking member includes a second plurality of integral layers of the non-water soluble material. The protective mask can be made by a two-material additive manufacturing system. A related method is also provided.

Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, e.g., sintered, formed, deposited, etc., to create the component.

In accordance with embodiments of the disclosure, advances in 3D printing and, more particularly, multi-head extruder additive manufacturing technology, find advantage in forming a protective mask. This technology may be referred to, among other things, as fused deposition modeling (FDM). In these additive manufacturing processes an object is built by selectively dispensing fluid in a predetermined path layer-by-layer. The part and/or dispensing head(s) may move in the X-Y direction. The part and/or dispensing head(s) may also move in the vertical direction to accommodate the build. The materials used may be, for example, thermoplastic polymers, ceramics, etc., that are in a fluid form. Once each layer is created, each two dimensional slice of the part geometry hardens. The material may naturally harden or may be cured using, e.g., cooling, heating, or ultraviolet light exposure.

The part to be protected may be formed by conventional subtractive techniques, but can also be built using additive manufacturing. For example, in metal powder additive manufacturing techniques, such as direct metal laser melting (DMLM) (also referred to as selective laser melting (SLM)), metal powder layers are sequentially melted together to form the part. More specifically, fine metal powder layers are sequentially melted after being uniformly distributed using an applicator on a metal powder bed. Each applicator includes an applicator element in the form of a lip, brush, blade or roller made of metal, plastic, material, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two dimensional layer, and the process repeats until the component is completely formed.

Referring to the drawings, FIG. 1 shows a perspective view and FIG. 2 shows an enlarged, partial side view, of a protective mask 100 according to various embodiments of the disclosure. As noted, protective mask 100 protects a part 102 during post-part formation processing, e.g., thermal treatment, coating, surface finishing, etc. Part 102 includes a plurality of openings 104 in a surface 106 thereof. Part 102 may include any now known or later developed industrial part. In one non-limiting example, part 102 may include a turbine rotor blade that includes a variety of internal cooling circuits (see e.g., FIG. 3) that vent to an outer surface, e.g., surface 106, of the part through cooling passages. The cooling passages may be provided to cool the internal structure where they are present, and/or create a cooling film across surface 106 of part 102. Although not necessary in all instances, as shown in the FIG. 1 example, openings 104 may be positioned in a pedestal 110 in surface 106 of the part extending from another surface 112 of the part. Openings 104 may have any cross-sectional shape at surface 106, e.g., circular, oval, polygonal (square, rectangular, trapezoidal, etc.), diffuser shaped, etc., and may extend in any direction relative to surface 106 into part 102. Openings 104 may be positioned across surface 106 in a spaced manner, e.g., equidistant or not equidistant. Part 102 may be formed using any now known or later developed technique. In one non-limiting example, part 102 may be formed by additive manufacturing, e.g., DMLM or SLM. As these processes are well known, details of their processing will not be described in detail other than to state that the process includes providing a metal powder bed within a processing chamber, and sequentially melting layers of metal powder on the metal powder bed to generate part 102 including openings 104.

With continuing reference to FIGS. 1 and 2, protective mask 100 may include a mounting member 120 at least partially within each of at least two of plurality of openings 104. Mounting member 120 may extend to any necessary extent into a respective opening 104 to maintain its position in each opening 104, where used. Mounting member 120 may be applied in a few as two openings 104. In FIG. 2, two mounting members 120 are shown in openings 104, and in FIG. 1, twelve mounting members 120 are using in openings 120. In certain embodiments, each opening 104 may include a mounting member 120 at least partially therein, resulting in mounting members 120 being positioned in a spaced manner across surface 106, where openings 104 are so arranged. As shown in FIG. 2, mounting member 120 may optionally extend outwardly from a respective opening 104 along surface 106 of part 102. That is, as shown in FIG. 2, mounting member 120 may cover a portion 122 of surface 106. Mounting member(s) 120 may have any desired height from surface 106. For example, mounting member(s) 120 may have a height greater than an expected thickness of coating(s) 170 (FIG. 6) to be applied to part 102 to prevent bridging of coating(s) 170 over mounting member(s) 120 and/or a masking member 130 (described herein), and reduce or eliminate cracking of coating(s) 170 that may be caused during removal of protective mask 100.

In accordance with embodiments of the disclosure, each mounting member 120 includes a water soluble material, i.e., it is able to be dissolved by water. The water soluble material may include any now known or later developed water soluble polymer, ceramic, etc., that can withstand the environment of the processing to be applied with protective mask 100 in place. In one non-limiting example, the water-soluble material may include a water soluble ceramic, which can withstand, among other things, thermal processing, coating processing such as application of a TBC, and shot peening of surface 106.

Protective mask 100 may also include a masking member 130 coupling the at least two mounting members 120. In contrast to mounting members 120, masking member 130 includes a non-water soluble material, i.e., it is incapable of dissolving in water. The non-water soluble material may include any now known or later developed water insoluble material such as but not limited to: polymer or ceramic, that can withstand the environment of the processing to be applied with protective mask 100 once hardened. In addition, the non-water soluble material should have sufficient structural strength to maintain the position of itself and mounting members 120.

Masking member 130 may take any form of structure capable of coupling mounting members 120 together and at least partially cover mounting members 120. In one non-limiting example, masking member 130 may include a first member 132 coupled to a respective one of at least two mounting members 120, and a second member 134 coupling each of first members 132 together. First member 132 may include any structure capable of coupling the disparate materials of first member 132 and mounting member 120 together. First member 132 may also include any structure that makes it easy to remove, e.g., 'snap off', protective mask 100, e.g., with pry points and/or grip locations. While shown as having surface-to-surface contact in FIG. 2, as shown in FIG. 3, first member 132 and/or mounting member 120 may have interacting structure 136 that couples them together such as but not limited to: male-female interfaces, bonded material, etc. Masking member 130, and more particularly, first member 132 thereof covers at least a portion of each mounting member 120. In FIGS. 1 and 2, masking member 130 covers most, if not all, of mounting member 120. However, as shown in FIG. 3, masking member 130 may leave a portion 138 of mounting members 120 exposed. This latter arrangement may be desirable, for example, where mounting member 120 material is less expensive than masking member 130 material, and mounting member 120 material can withstand the environment of the processing without damage, although it is exposed.

FIGS. 1-3 also show an additively manufactured (AM) structure 140 including part 102 and protective mask 100.

Figure 4:
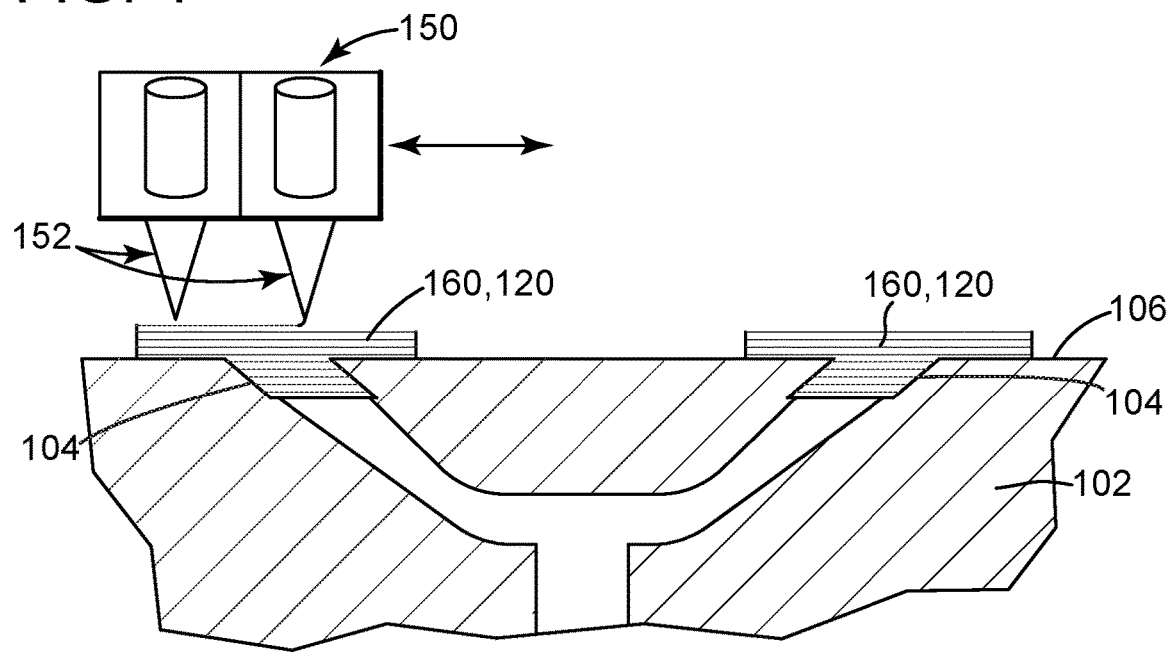
FIG. 4 shows a side view of sequentially forming a mounting member of the protective mask, according to embodiments of the disclosure.
Figure 5:
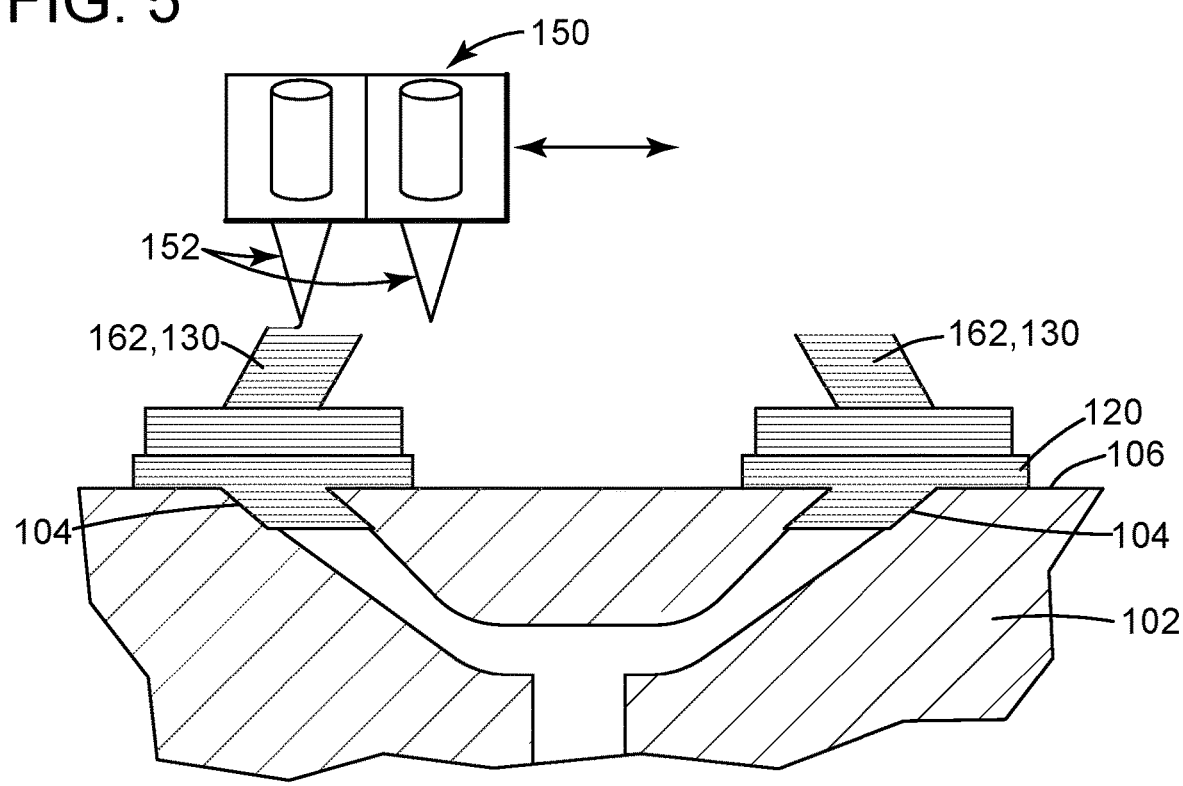
FIG. 5 shows a side view of sequentially forming a masking member of the protective mask, according to embodiments of the disclosure.

As shown in FIGS. 4 and 5, a method in accordance with embodiments of the disclosure may include forming at least two mounting members 120 and masking member(s) 130 using an at least two material additive manufacturing (AM) system 150. AM system 150 may include any now known or later developed additive manufacturing system capable of printing with the two materials, e.g., water soluble material of mounting members 120 and non-water soluble material of masking member 130. In one non-limiting example, AM system 150 may be based on FDM technology, as described herein. As illustrated, AM system 150 may include duel dispensing heads 152; however, a single dispensing head capable of handling both materials may also be possible. As shown in the cross-sectional view of FIG. 4, the method may include first sequentially dispensing a fluid water soluble material 160 in a pre-determined path layer-by-layer to selectively generate mounting member 120 (shown partially created) at least partially within at least two of a plurality of openings 104 in surface 106 of part 102. As used herein, "dispensing" includes any manner in which AM system 150 creates layers such as but not limited to: laying out, spraying with back pressure, depositing, sintering, etc. Also, "fluid" indicates the material generally has no fixed shape and yields easily to outside pressure, e.g., a liquid or paste.

FIG. 5 shows second sequentially dispensing a fluid non-water soluble material 162 in a pre-determined path layer-by-layer to selectively generate masking member 130 (shown partially created) coupling the at least two mounting members 120. As understood, at least a portion of AM system 150 and/or part 102 may move horizontally to create the layers as the dispensing occurs. As also understood, AM system 150 and/or part 102 may be moved vertically between layers to accommodate the growth of AM structure 140. Mounting members 120 may be fully completed prior to starting masking member 130, or, if AM system 150 is capable, both members 120, 130 may be formed at the same time, e.g., with material changes within a given layer. As a result of additively manufacturing mounting members 120 and masking member 130, each mounting member 120 includes a plurality of integral layers of the water soluble material, and masking member 130 includes a plurality of integral layers of the non-water soluble material.

As noted herein, prior to the first sequentially dispensing, part 102 may be formed by additive manufacture. For example, part 102 may be made by another AM system such as a DMLM machine that provides a metal powder bed within a processing chamber, and sequentially melts layers of metal powder on the metal powder bed to generate part 102 including openings 104.

Figure 6:
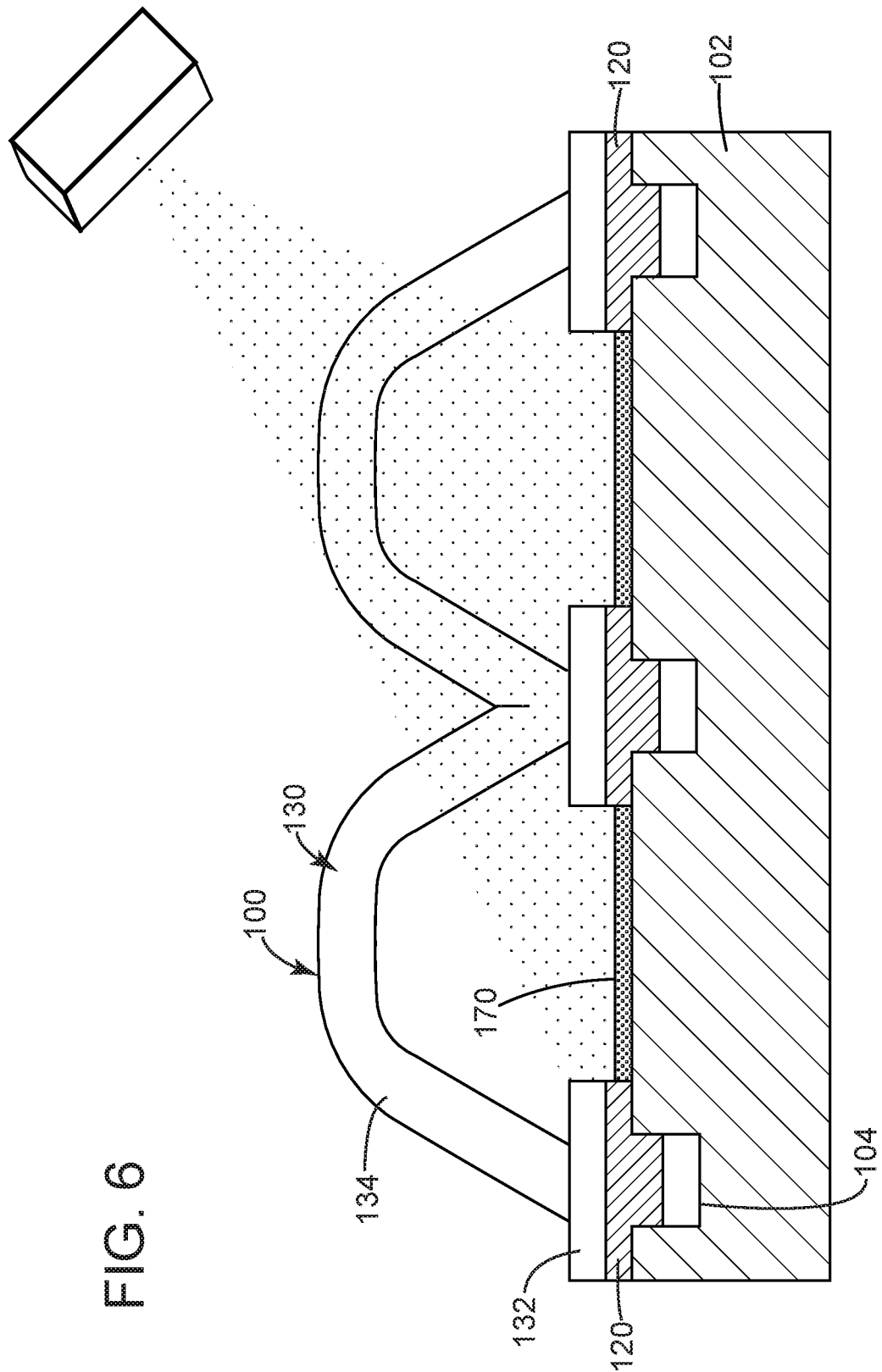
FIG. 6 shows an enlarged, side view of applying a coating to an AM structure, according to embodiments of the disclosure.
Figure 7:
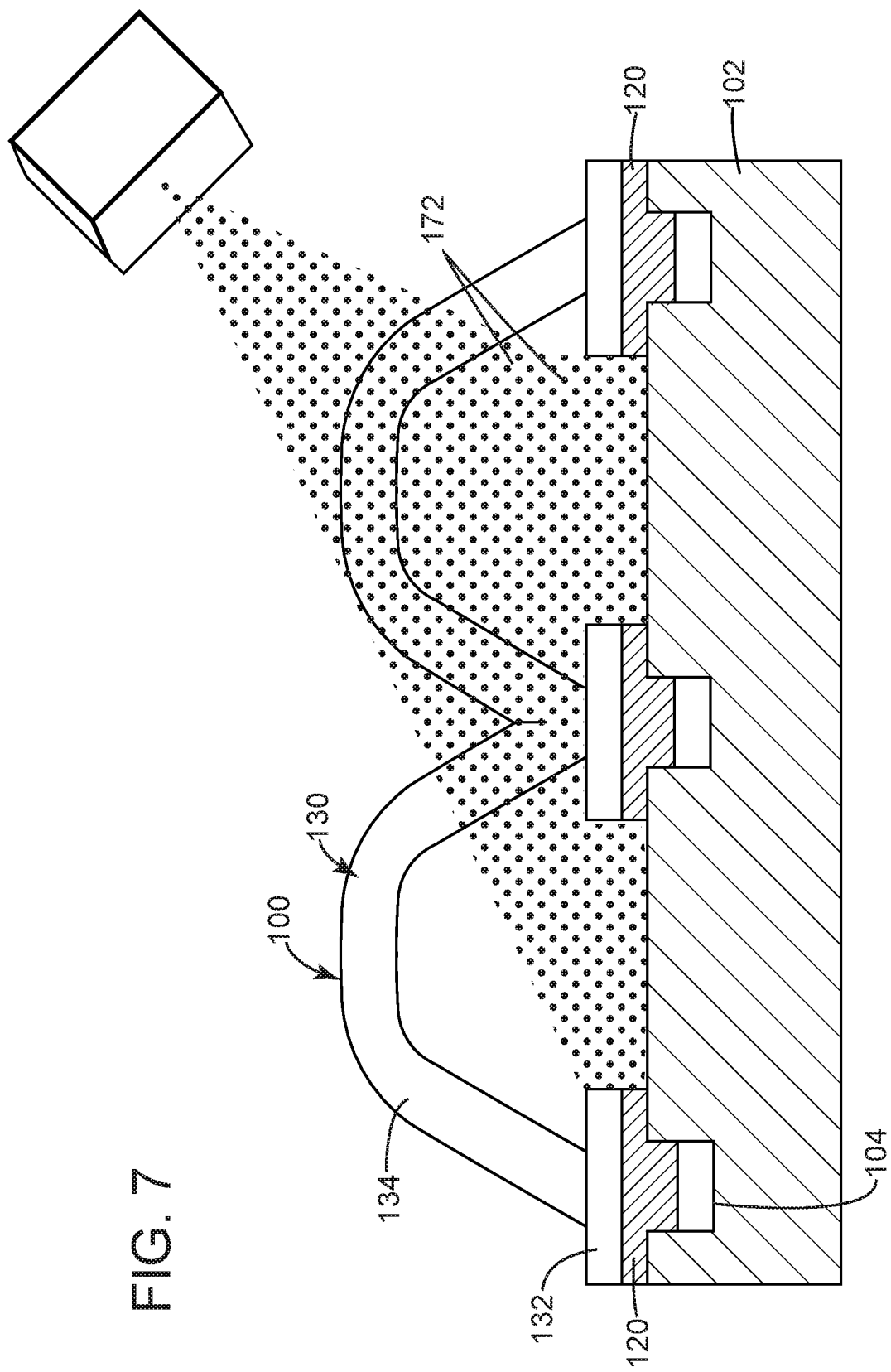
FIG. 7 shows an enlarged, side view of shot peening an AM structure, according to embodiments of the disclosure.

FIGS. 6 and 7 show illustrative processing that may be applied to part 102 having protective mask 100 applied thereto. It is emphasized that the illustrative processes are only two of a large number of processes that could be applied to part 102 with protective mask 100 thereon. FIG. 6 shows applying coating(s) 170 on part 102, e.g., by thermal spraying or other appropriate technique. As illustrated, mounting members 120 prevent coating 170 from entering openings 104. As noted previously, mounting member(s) 120 may have height from surface 106 selected to be greater than an expected thickness of coating(s) 170 (FIG. 6) to be applied to part 102. In this manner, mounting member 120 may reduce or prevent bridging of coating(s) 170 over mounting member(s) 120 and/or masking member 130, and reduce or eliminate cracking of coating(s) 170 that may be caused during removal of protective mask 100. Coating(s) 170 may include any now known or later developed coating such as but not limited: paint(s), thermal barrier coating(s), environmental coating(s), etc. FIG. 7 shows applying a shot peening to part 102. As illustrated, mounting members 120 prevent shot material 172, e.g., metal shot, from entering or damaging openings 104. Masking member 130 covers at least a portion of mounting members 120 to protect mounting members 120 during the shot peening, e.g., where they are made of a material that cannot withstand the shot peening. It is understood that the shot peening of FIG. 7 may be applied prior to the coating of FIG. 6.

Figure 8:
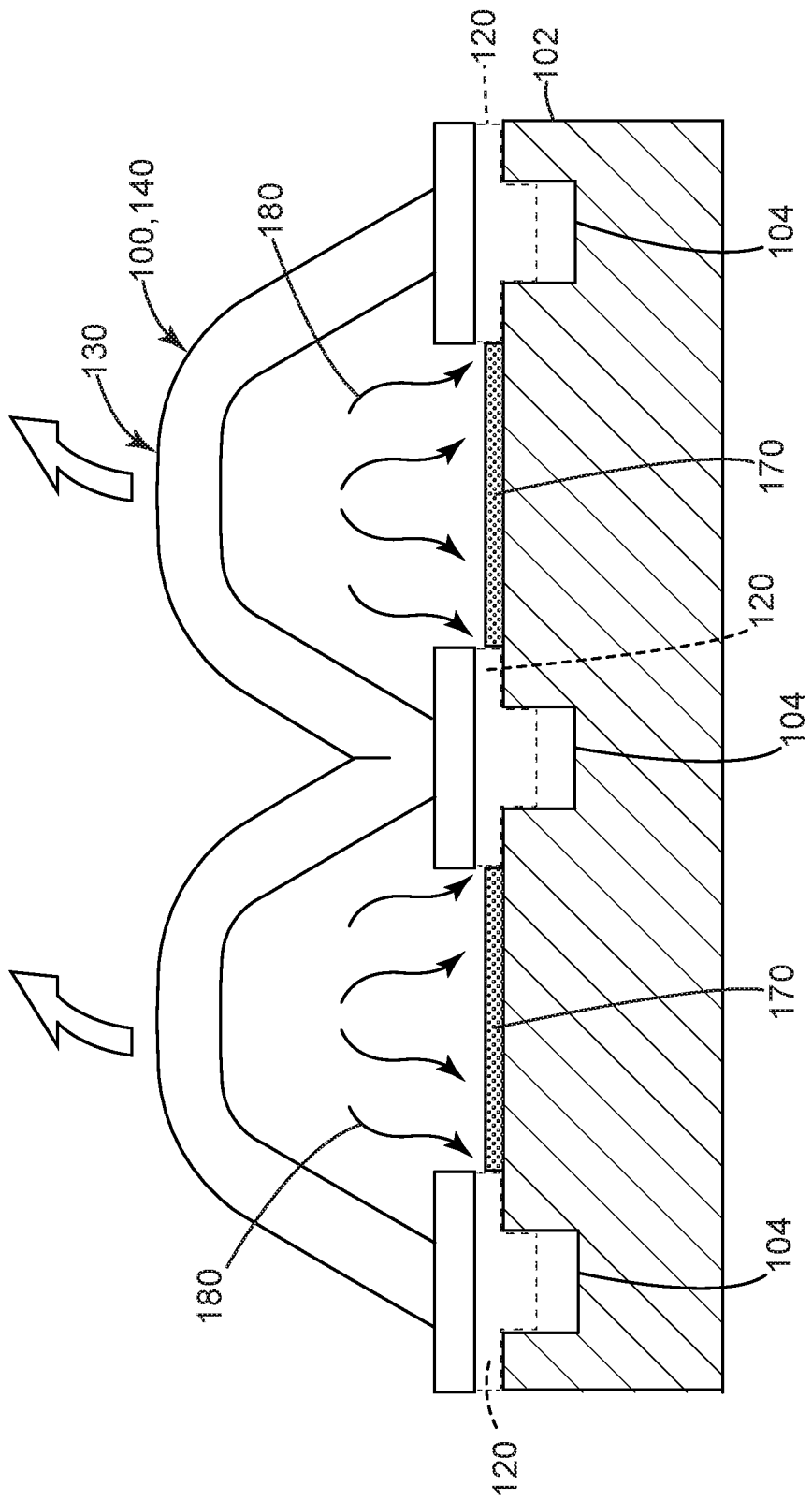
FIG. 8 shows an enlarged, side view of dissolving a mounting member, according to embodiments of the disclosure.

FIG. 8 shows exposing mounting members 120 (FIGS. 6-7) to water 180 to remove mounting members 120, and release masking member 130. Mounting members 120 may be exposed to water 180 in any fashion, e.g., by delivering a flow onto mounting members 120, immersion, spraying, etc. In any event, exposure to water 180 dissolves the water soluble material of mounting members 120—only one remaining, partial member shown in FIG. 8. Once mounting members 120 are at least mostly removed, masking member 130 is released, i.e., it will fall off or can be readily removed. Masking member 130 may be disposed of or reused, where possible. As shown in FIG. 8, openings 104 are devoid of any damage or material therein that could block their intended operation.

Embodiments of the disclosure provide an integral, printed two-material protective mask 100 including mounting member 120 that can be "washed off" allowing the remaining portion of masking member 130 to easily fall off. Protective mask 100 may be easily removed with gravity and/or pry points and grip locations provided by first member 132 of masking member 130. As described, integrally attached protective mask 100 is useful in processing of part 102. Notably, protective mask 100 eliminates costly machining and/or cleanout of openings 104, and reduces the risk of damaging the openings' geometry, e.g., during shot peening. Protective mask 100 may also significantly lower labor costs, and plant and equipment costs relative to electrochemical machining (ECM), laser drilling or ablation, that would otherwise be required to clean and/or repair openings 104. Mounting member 120 can be configured to prevent any coating from bridging over the protective mask, thus reducing or preventing cracking in the rest of the coating, e.g., a TBC, that may render the part unusable or require extensive additional processing.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A protective mask for a part, the part including a plurality of openings in a surface thereof, the protective mask comprising:
a mounting member at least partially within each of at least two of the plurality of openings, wherein each mounting member includes a water soluble material; and
a masking member coupled to the mounting member, the masking member including:
a non-water soluble material,
a first member coupled to each of the at least two mounting members, and
a second member coupling the first members together and physically separated from the part.

2. The protective mask of claim 1, wherein the plurality of openings is positioned across the surface in a spaced manner, and wherein each opening includes a mounting member at least partially therein.

3. The protective mask of claim 1, wherein the mounting member extends outwardly from a respective opening along the surface of the part.

4. The protective mask of claim 1, wherein the mounting members and the masking member are formed using an at least two material additive manufacturing system.

5. The protective mask of claim 1, wherein the plurality of openings is positioned in a pedestal in the surface of the part extending from another surface of the part.

6. The protective mask of claim 1, wherein the masking member covers at least a portion of each mounting member.

7. The protective mask of claim 1, wherein the protective mask includes an additively manufactured (AM) structure.

8. The protective mask of claim 7, wherein the masking member covers at least a portion of each mounting member.

9. The protective mask of claim 7, wherein the plurality of openings is positioned across the surface in a spaced manner, and wherein each opening includes a mounting member at least partially therein.

10. The protective mask of claim 7, wherein the mounting member extends outwardly from a respective opening along the surface of the part.

11. The protective mask of claim 1, wherein the second member is curved.

12. The protective mask of claim 1, wherein exposing the at least two mounting members to water removes the at least two mounting members, and releases the masking member.

13. The protective mask of claim 1, wherein the at least two mounting members each include a sawtooth pattern configured to mate with a sawtooth pattern in respective first members of the plurality of first members.

14. A protective mask for a part, the part including a plurality of openings in a surface thereof, the protective mask comprising:
a first mounting member at least partially within a first opening of the plurality of openings,
a second mounting member at least partially within a second opening of the plurality of openings,
wherein each of the first and second mounting members includes a water soluble material; and
a masking member coupled to the first and second mounting members, the masking member including:
a first masking member coupled to the first mounting member,
a second masking member coupled to the second mounting member, and
a connecting member coupling the first and second masking members together and physically separated from the part,
wherein the masking member includes a non-water soluble material.

15. The protective mask of claim 14, wherein the plurality of openings is positioned across the surface in a spaced manner, and wherein each opening of the plurality of openings includes a respective mounting member of the first and second mounting members at least partially therein.

16. The protective mask of claim 14, wherein each of the first and second mounting members extends outwardly from a respective opening of the plurality of openings along the surface of the part.

17. The protective mask of claim 14, wherein the first and second mounting members and the first and second masking members are formed using an at least two material additive manufacturing system.

18. The protective mask of claim 14, wherein the plurality of openings is positioned in a pedestal in the surface of the part extending from another surface of the part.

19. The protective mask of claim 14, wherein exposing each mounting member of the first and second mounting members to water removes the first and second mounting members, and releases the masking member.

20. The protective mask of claim 14, wherein each mounting member of the first and second mounting members includes a sawtooth pattern configured to mate with a complementary sawtooth pattern in a respective masking member of the first and second masking members.

* * * * *